Feb. 7, 1956 S. G. BRADY 2,733,701
ADJUSTABLE PATTERN FOR TRIMMING MECHANISMS
Filed Jan. 16, 1953 2 Sheets-Sheet 1
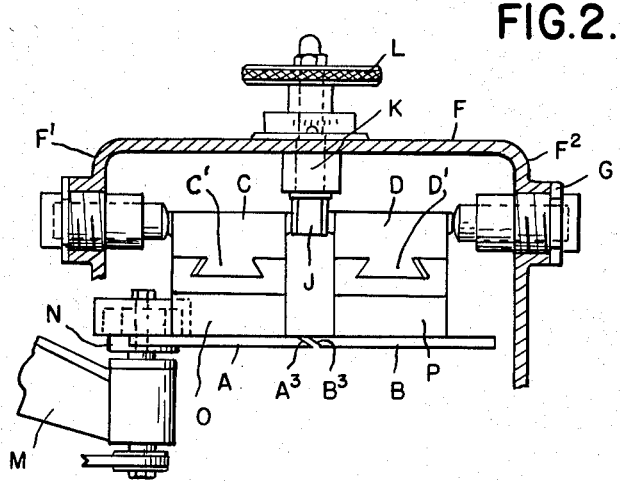
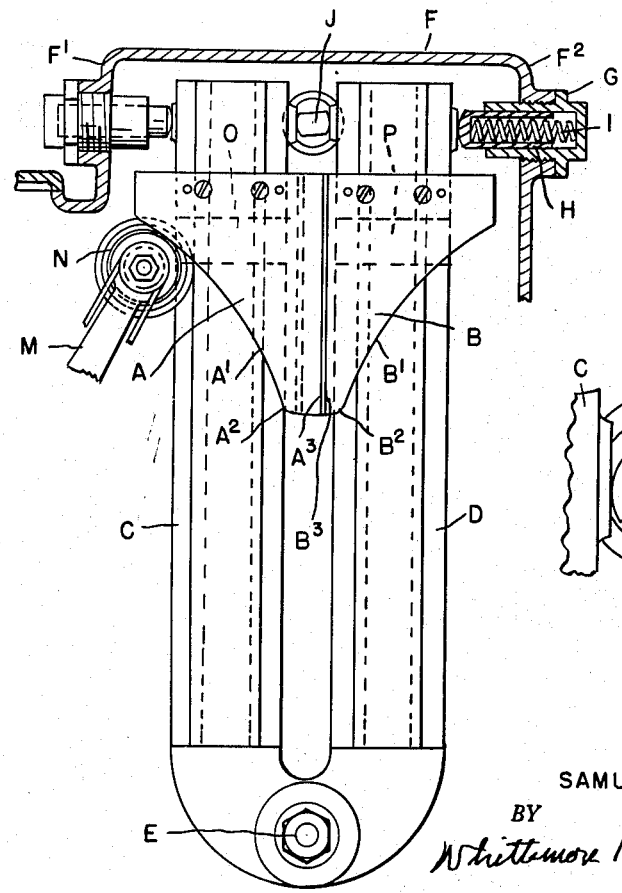
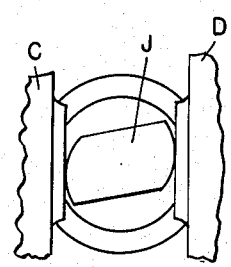
*INVENTOR.*
SAMUEL G. BRADY
BY
ATTORNEYS

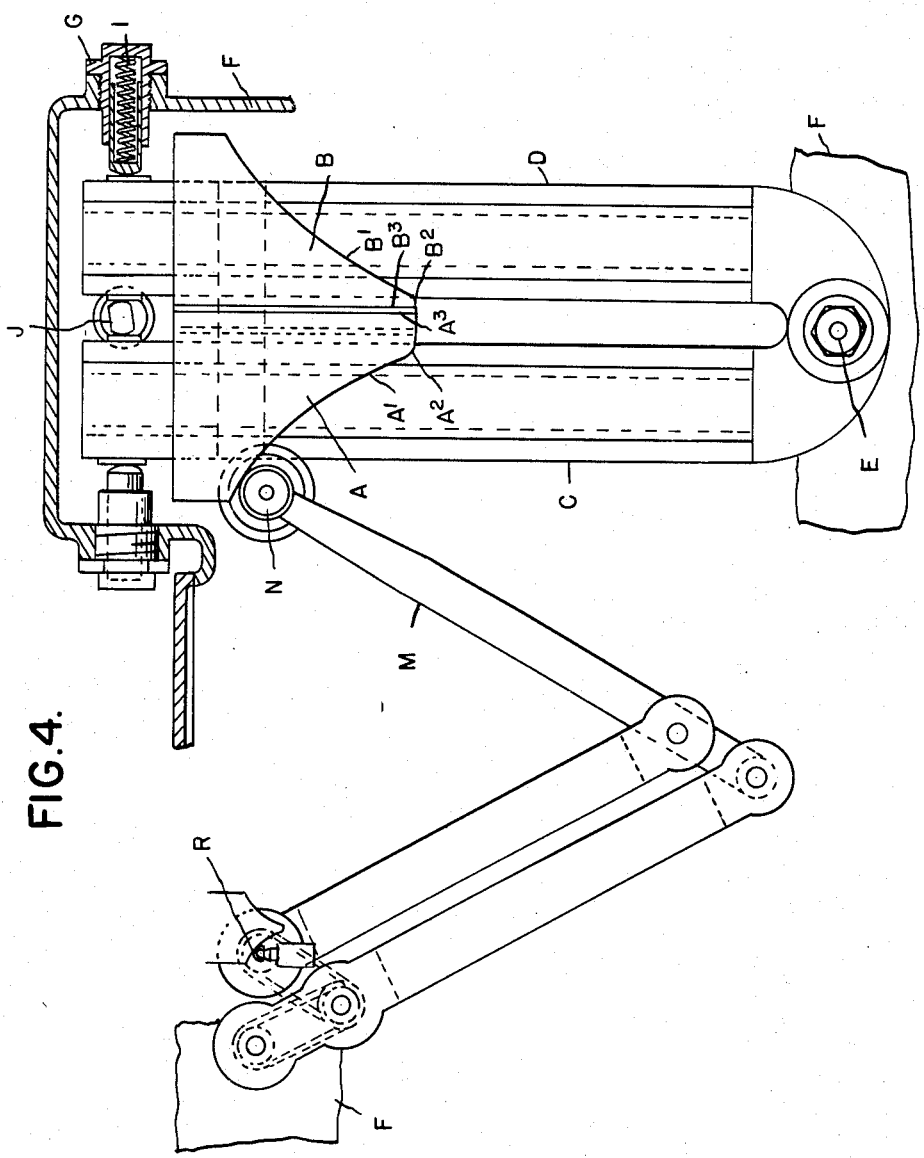

United States Patent Office 2,733,701
Patented Feb. 7, 1956

2,733,701
ADJUSTABLE PATTERN FOR TRIMMING MECHANISMS

Samuel G. Brady, Royal Oak, Mich., assignor to The Gear Grinding Machine Company, Detroit, Mich., a corporation of Michigan Application January 16, 1953, Serial No. 331,537

2 Claims. (Cl. 125—11)

The invention relates to trimming mechanisms for grinder wheels in which the contour trimmed is controlled by a pattern of larger dimensions. Usually a pantograph is employed for operating the trimming cutter so that the trimmed form will be the same as that of the pattern but on a smaller scale. Where such trimming mechanism is used in connection with a gear grinding machine the pattern has contour portions corresponding to opposite sides of a gear tooth or the sides of a pair of teeth on opposite sides of an inter-dental space. These contour portions are in such relation to each other as to produce a predetermined tooth thickness. If, however, it is desired to change the tooth thickness or the clearance between the teeth of one gear and those of a mating gear a different pattern is required.

It is the object of the invention to obtain a construction of pattern and mounting therefor, which in connection with the other elements of the trimming mechanism may be used in a gear grinding machine to grind teeth of different thickness. To this end the invention consists in the construction as hereinafter set forth.

In the drawings:

Fig. 1 is a front elevation of a gear tooth pattern and its mounting showing a portion of the pantograph trimming mechanism directly in engagement therewith;

Fig. 2 is a plan view thereof;

Fig. 3 is an enlarged elevation of the adjusting means for the pattern members.

Fig. 4 is an elevation of the entire trimming mechanism.

In the grinding of teeth of a gear wheel by a formed grinder the work is periodically indexed in relation to the path of movement of the grinder wheel so as to bring the teeth successively in position for grinding. The indexing movement is about the center of the gear wheel and the contour portions of the grinding surface for opposite sides of the teeth are so positioned relative to each other as to produce the same tooth thickness in each of the teeth successively ground. In the trimming mechanism the pattern has corresponding contour portions mounted in fixed relation to each other. If these two pattern portions were made of separate members, adjustable one in relation to the other, the thickness of the tooth might be varied but there would be danger of losing the accuracy of tooth form. With my improved construction of pattern and mounting the contours respectively for opposite sides of the tooth are on separate members but the mounting is such as to maintain each of these members in constant relation to a center corresponding to the center of the gear wheel.

As shown in Fig. 1, A and B are separate complementary pattern members and C and D are mounting members to which said pattern members are respectively secured. The members C and D extend downward beyond the pattern and are connected to each other at their lower ends by a pivot E. This pivot is positioned in relation to the pattern to correspond to the relation of the teeth to the center of the gear. It is, therefore, obvious that if the portions of the mounting to which the pattern members are secured should be adjusted towards of from each other, this would not change the relation of the curved contour of each pattern member to the center of the gear but would change the distance of said contour portions from each other. For accomplishing such adjustment the members C and D are arranged within a recess in a mounting frame F to have portions F' and F² on opposite sides thereof. Hollow cap members G extend through and are threadedly engaged with the portions F' and F² and a hollow plunger member H is within each hollow cap member and is biased by a coil spring I to bear against the adjacent member C or D. Between the members C and D is a cam J on a shaft K, which latter is rotatively mounted in the frame F and is clamped in different positions of adjustment by a nut L threadedly engaging said shaft. This permits of either spreading the members C and D apart or adjusting them nearer to each other within certain limits. The member A has a contour portion A' corresponding to one side of a gear tooth and the member B has a contour portion B' corresponding to the opposite side of the gear tooth. There are also contour portions A² and B² extending between the portions A' and B'. To avoid any gap between the contour portions A² and B² the members A and B overlap each other, preferably by obliquely arranging their adjacent edge portions A³ and B³. Within the range of adjustment these portions will always overlap each other to form a continuous track from one member to the other. The pantograph M has a roller N adapted to travel along the track over the contour portions A', A², B², and B', thereby moving the trimming cutter (not shown) through a similar path but on a reduced scale. The pantograph M is mounted on the frame F by the stationary pivot Q and has a trimming cutter R.

Gear grinding machines are adapted to grind gear wheels varying in diameters. Where there is a change from a wheel of one diameter to that of another there must be a corresponding adjustment of the relation between the pattern members A and B and the pivot E. This is accomplished by providing mounting blocks O and P for the respective pattern members A and B, said blocks being longitudinally adjustable on the members C and D. As specifically shown the members C and D have dovetailed ribs C' and D' extending longitudinally thereof and the blocks O and P have dovetailed slots engaging said ribs with suitable clamping means for holding the blocks in different positions of adjustment. With such construction the operator before starting the trimming operation will first adjust the blocks O and P to arrange the pattern members A and B in proper relation to the pivot E and will then adjust the cam J to obtain the desired width of tooth thickness.

While I have specifically described a construction for trimming a grinder wheel to a form for grinding gear teeth, the invention is also applicable to other structures. In fact, it may be used in connection with the trimming of any rotary form grinder without regard to whether the contour trimmed corresponds to a gear tooth or any other repetitive form on a rotary member.

What I claim as my invention is:

1. In a trimming mechanism for form grinders designed to fashion the contour of repetitive peripheral projecting portions of a rotary work member and including a pantograph, a cutter actuated thereby, a pattern for guiding said pantograph and a common frame on which said pantograph and pattern are mounted; a pair of separate members forming complementary opposite side portions of said pattern and a pair of members pivotally attached to each other and to said frame in a plane centrally between and at a point spaced from said complementary members and on which the latter are directly mounted to be adjustable therewith towards or from each other while each maintains a constant distance from an angular relation to the axis of the pivot.

2. The construction as in claim 1 in which said separate members have contour portions overlapping each other in all positions of relative adjustment.

References Cited in the file of this patent

UNITED STATES PATENTS

| | | |
|---|---|---|
| 745,767 | Berkley | Dec. 1, 1903 |
| 1,468,228 | Dobazenecki | Sept. 18, 1923 |
| 2,321,825 | Kopec | June 15, 1943 |
| 2,570,950 | Hornik | Oct. 9, 1951 |
| 2,586,937 | Gotberg | Feb. 26, 1952 |

FOREIGN PATENTS

| | | |
|---|---|---|
| 85,998 | Germany | Apr. 14, 1896 |
| 150,028 | Germany | Apr. 12, 1904 |
| 371,268 | Germany | Mar. 13, 1923 |